(12) United States Patent  
Miller (10) Patent No.: US 12,007,618 B2  
(45) Date of Patent: Jun. 11, 2024

(54) GUIDED AUTOFOCUS ASSEMBLY

(71) Applicant: Hutchinson Technology Incorporated, Hutchinson, MN (US)

(72) Inventor: Mark A. Miller, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 1 day.

(21) Appl. No.: 17/543,422

(22) Filed: Dec. 6, 2021

(65) Prior Publication Data

US 2022/0091356 A1  Mar. 24, 2022

Related U.S. Application Data

(63) Continuation of application No. 17/189,034, filed on Mar. 1, 2021, now Pat. No. 11,194,115.

(60) Provisional application No. 63/073,782, filed on Sep. 2, 2020.

(51) Int. Cl.
*G02B 7/02* (2021.01)
*G02B 7/09* (2021.01)

(52) U.S. Cl.
CPC ........ *G02B 7/02* (2013.01); *G02B 7/09* (2013.01)

(58) Field of Classification Search
None
See application file for complete search history.

(56) References Cited

U.S. PATENT DOCUMENTS

| 5,539,491 | A | 7/1996 | Toshikatsu et al. |
| 5,862,015 | A | 1/1999 | Evans et al. |
| 5,883,759 | A | 3/1999 | Schulz |
| 5,946,163 | A | 8/1999 | Boutaghou et al. |
| 6,002,168 | A | 12/1999 | Bellaar et al. |
| 6,147,840 | A | 11/2000 | Khan |
| 6,823,582 | B1 | 11/2004 | Mostafazadeh et al. |

(Continued)

FOREIGN PATENT DOCUMENTS

| CN | 1928612 A | 3/2007 |
| CN | 101416090 A | 4/2009 |

(Continued)

OTHER PUBLICATIONS

International Search Report and Written Opinion in International Application No. PCT/US2017/066864, mailed Mar. 5, 2018.

(Continued)

*Primary Examiner* — Stephone B Allen
*Assistant Examiner* — Tamara Y. Washington
(74) *Attorney, Agent, or Firm* — DLA Piper LLP (US)

(57) ABSTRACT

Autofocus assembly and related methods are described. One example of an autofocus assembly includes a housing element. The housing element including a hall housing wall configured to secure a hall sensor. The autofocus assembly includes a lens carriage configured to secure a hall magnet and configured to be received within the housing element and configured to define a receiving space between the lens carriage and the housing element to receive one or more bearing elements. The autofocus assembly includes a magnetic element disposed at the hall housing wall and configured to magnetically attract the hall magnet and to secure the hall housing wall to the housing element and secure the one or more bearing elements between the hall housing wall and the lens carriage.

9 Claims, 5 Drawing Sheets

(56) References Cited

U.S. PATENT DOCUMENTS

| | | |
|---|---|---|
| 7,384,531 B1 | 6/2008 | Peltoma et al. |
| 7,388,733 B2 | 6/2008 | Swanson et al. |
| 7,489,340 B2 | 2/2009 | Koo et al. |
| 7,929,252 B1 | 4/2011 | Hentges et al. |
| 8,144,430 B2 | 3/2012 | Hentges et al. |
| 8,169,746 B1 | 5/2012 | Rice et al. |
| 8,254,769 B2 | 8/2012 | Wu et al. |
| 8,593,568 B2 | 11/2013 | Topliss et al. |
| 8,736,988 B2 | 5/2014 | Cheng et al. |
| 8,885,299 B1 | 11/2014 | Bennin et al. |
| 8,941,951 B2 | 1/2015 | Bennin et al. |
| 9,175,671 B2 | 11/2015 | Howarth |
| 9,366,879 B1 | 6/2016 | Miller |
| 9,479,699 B2 | 10/2016 | Brown et al. |
| 10,802,242 B2 | 10/2020 | Miller et al. |
| 11,194,115 B1 | 12/2021 | Miller |
| 11,199,182 B2 | 12/2021 | Miller et al. |
| 2002/0090749 A1 | 7/2002 | Simmons |
| 2003/0006271 A1 | 1/2003 | Chen et al. |
| 2004/0233581 A1 | 11/2004 | Poorman |
| 2005/0093181 A1 | 5/2005 | Brandenburg et al. |
| 2005/0206781 A1 | 9/2005 | Sawada |
| 2005/0236708 A1 | 10/2005 | Farnworth et al. |
| 2006/0017815 A1 | 1/2006 | Stavely et al. |
| 2006/0018646 A1 | 1/2006 | Stavely |
| 2006/0092514 A1 | 5/2006 | Koo et al. |
| 2006/0150627 A1 | 7/2006 | Oohara |
| 2006/0272328 A1 | 12/2006 | Hara et al. |
| 2007/0279497 A1 | 12/2007 | Wada et al. |
| 2008/0198249 A1 | 8/2008 | Tanimura et al. |
| 2008/0237840 A1 | 10/2008 | Alcoe et al. |
| 2008/0239576 A1 | 10/2008 | Higashi et al. |
| 2008/0247748 A1 | 10/2008 | Tanimura et al. |
| 2009/0103194 A1 | 4/2009 | Chen |
| 2009/0244325 A1 | 10/2009 | Honjo et al. |
| 2010/0283887 A1 | 11/2010 | Topliss et al. |
| 2011/0120111 A1 | 5/2011 | Alexander et al. |
| 2012/0043116 A1 | 2/2012 | Kim et al. |
| 2013/0182176 A1 | 7/2013 | Honda |
| 2014/0043496 A1 | 2/2014 | Azuma |
| 2015/0135703 A1 | 5/2015 | Eddington et al. |
| 2015/0177477 A1 | 6/2015 | Hubert |
| 2015/0304561 A1 | 10/2015 | Howarth et al. |
| 2015/0346507 A1 | 12/2015 | Howarth |
| 2015/0350500 A1 | 12/2015 | Gutierrez et al. |
| 2015/0365568 A1 | 12/2015 | Topliss et al. |
| 2016/0154250 A1 | 6/2016 | Miller |
| 2016/0154251 A1 | 6/2016 | Ladwig et al. |
| 2016/0219222 A1* | 7/2016 | Heo ..................... H04N 23/55 |
| 2016/0227088 A1 | 8/2016 | Brown et al. |
| 2016/0259177 A1 | 9/2016 | Ladwig et al. |
| 2017/0080255 A1 | 3/2017 | Law et al. |
| 2017/0118408 A1 | 4/2017 | Gregory et al. |
| 2018/0052299 A1 | 2/2018 | Miller et al. |
| 2018/0171991 A1 | 6/2018 | Miller et al. |
| 2020/0362837 A1 | 11/2020 | Bunting et al. |
| 2021/0223563 A1 | 7/2021 | Miller et al. |
| 2021/0318509 A1 | 10/2021 | Jun |
| 2022/0091356 A1 | 3/2022 | Miller |
| 2022/0099072 A1 | 3/2022 | Miller et al. |
| 2022/0128046 A1 | 4/2022 | Ruzicka et al. |
| 2022/0357544 A1 | 11/2022 | Miller |

FOREIGN PATENT DOCUMENTS

| | | |
|---|---|---|
| CN | 104204935 A | 12/2014 |
| EP | 1 153 774 A2 | 11/2001 |
| EP | 2 813 877 A1 | 12/2014 |
| GB | 1221306.2 | 11/2012 |
| GB | 2569036 A | 6/2019 |
| GB | 2570171 A | 7/2019 |
| GB | 2569668 B | 5/2020 |
| JP | 11-337996 A | 12/1999 |
| JP | 2001-222379 A | 8/2001 |
| JP | 2006-31023 A | 2/2006 |
| JP | 2008-203402 A | 9/2008 |
| JP | 2010-268133 A | 11/2010 |
| JP | 2012-502323 A | 1/2012 |
| JP | 2015-518977 A | 7/2015 |
| JP | 2015-537247 A | 12/2015 |
| KR | 2015-0053657 A | 5/2015 |
| KR | 2015-0083250 A | 7/2015 |
| WO | WO 2010/089529 A1 | 8/2010 |
| WO | WO 2013/118601 A1 | 8/2013 |
| WO | WO 2013/121225 A1 | 8/2013 |
| WO | WO 2013/175197 A1 | 11/2013 |
| WO | 2014/038920 A1 | 3/2014 |
| WO | WO 2014/083318 A1 | 6/2014 |
| WO | WO 2015/104908 A1 | 7/2015 |
| WO | WO 2019/243849 A1 | 12/2019 |

OTHER PUBLICATIONS

International Preliminary Report on Patentability in International Application No. PCT/US2017/066864, mailed Jun. 27, 2019.
International Search Report and Written Opinion in International Application No. PCT/US2020/067584, mailed Mar. 23, 2021.
International Preliminary Report on Patentability in International Application No. PCT/US2020/067584, mailed Jul. 21, 2022.
Partial Supplementary European Search Report in European Application No. 17879841.9, dated Jun. 19, 2020.
Extended European Search Report in European Application No. 17879841.9, dated Nov. 9, 2020.
Examination Report in European Application No. 17879841.9, dated Sep. 5, 2022.
Office Action in Chinese Patent Application No. 201780077472.9, dated Jul. 20, 2020.
Office Action in Chinese Patent Application No. 201780077472.9, dated Apr. 9, 2021.
Office Action in Chinese Patent Application No. 201780077472.9, dated Sep. 13, 2021.
Office Action in Chinese Patent Application No. 201780077472.9, dated Mar. 1, 2022.
Notice of Granting Patent Right for Invention in Chinese Patent Application No. 201780077472.9, dated Aug. 12, 2022.
Notice of Reasons for Refusal in Japanese Patent Application No. 2019-532062, dated Nov. 16, 2021.
Notice of Reasons for Refusal in Japanese Patent Application No. 2019-532062, dated Sep. 20, 2022.
Notice of Decision of Refusal in Japanese Patent Application No. 2019-532062, dated Jan. 24, 2023.
Notice of Preliminary Rejection in Korean Patent Application No. 10-2019-7019987, dated Apr. 13, 2022.
Notice of Allowance in Korean Patent Application No. 10-2019-7019987, dated Dec. 19, 2022.
Examination Report in United Kingdom Application No. 2209876.8, dated Jun. 5, 2023.
Office Action in U.S. Appl. No. 15/844,296, dated Nov. 7, 2018.
Office Action in U.S. Appl. No. 15/844,296, dated Jun. 6, 2019.
Office Action in U.S. Appl. No. 15/844,296, dated Nov. 20, 2019.
Office Action in U.S. Appl. No. 15/844,296, dated Mar. 12, 2020.
Office Action in U.S. Appl. No. 15/844,296, dated Aug. 25, 2020.
Office Action in U.S. Appl. No. 15/844,296, dated Feb. 22, 2021.
Notice of Allowance in U.S. Appl. No. 15/844,296, dated Jul. 30, 2021.
Office Action in U.S. Appl. No. 17/137,278, dated Jun. 17, 2021.
Office Action in U.S. Appl. No. 17/137,278, dated Sep. 30, 2021.
Office Action in U.S. Appl. No. 17/137,278, dated Apr. 15, 2022.
Office Action in U.S. Appl. No. 17/137,278, dated Sep. 6, 2022.
Notice of Allowance in U.S. Appl. No. 17/137,278, dated Oct. 25, 2022.
Office Action in U.S. Appl. No. 17/137,278, dated Mar. 3, 2023.
Office Action in U.S. Appl. No. 17/137,278, dated Jun. 29, 2023.
Office Action in U.S. Appl. No. 17/549,508, dated Oct. 20, 2022.
Office Action in U.S. Appl. No. 17/549,508, dated Mar. 31, 2023.
Office Action in U.S. Appl. No. 17/549,508, dated Jun. 29, 2023.
International Search Report and Written Opinion in International Application No. PCT/US2017/047931, mailed Oct. 27, 2017.

(56) References Cited

OTHER PUBLICATIONS

International Preliminary Report on Patentability in International Application No. PCT/US2017/047931, mailed Mar. 7, 2019.
Extended Search Report for European Patent Application No. 17844254.7 dated Mar. 3, 2020.
Office Action in U.S. Appl. No. 15/682,456, dated Nov. 9, 2018.
Office Action in U.S. Appl. No. 15/682,456, dated Jul. 25, 2019.
Office Action in U.S. Appl. No. 15/682,456, dated Jan. 23, 2020.
Notice of Allowance in U.S. Appl. No. 15/682,456, dated Jun. 12, 2020.
Combined Search and Examination Report in United Kingdom Application No. 2112407.8, dated May 4, 2022.
Office Action in U.S. Appl. No. 17/189,034, dated May 21, 2021.
Notice of Allowance in U.S. Appl. No. 17/189,034, dated Aug. 9, 2021.
Examination Report in United Kingdom Application No. 2112407.8, dated Jul. 20, 2023.
International Search Report and Written Opinion in International Application No. PCT/US2023/027692, mailed Oct. 6, 2023.

\* cited by examiner

GUIDED AUTOFOCUS ASSEMBLY

CROSS-REFERENCE TO RELATED APPLICATIONS

This application is a continuation of U.S. application Ser. No. 17/189,034 filed on Mar. 1, 2021, which claims the benefit of, and priority to, U.S. Provisional Application No. 63/073,782 filed on Sep. 2, 2020, which is hereby incorporated by reference in its entirety.

FIELD

Embodiments of the invention relate to the field of shape memory alloy systems. More particularly, embodiments of the invention relate to the field of shape memory allow actuators and methods related thereto.

BACKGROUND

Shape memory alloy ("SMA") systems have a moving assembly or structure that for example can be used in conjunction with a camera lens element as an auto-focusing drive. These systems may be enclosed by a structure such as a screening can. The moving assembly is supported for movement on a support assembly. The flexure element, which is formed from metal such as phosphor bronze or stainless steel, has a moving plate and flexures. The flexures extend between the moving plate and the stationary support assembly and function as springs to enable the movement of the moving assembly with respect to the stationary support assembly. The moving assembly and support assembly are coupled by four shape memory alloy (SMA) wires extending between the assemblies. Each of the SMA wires has one end attached to the support assembly, and an opposite end attached to the moving assembly. The suspension is actuated by applying electrical drive signals to the SMA wires. However, these types of systems are plagued by the complexity of the systems that result in bulky systems that require a large foot print and a large height clearance. Further, current systems fails to provide high Z-stroke range with a compact, low profile footprint.

SUMMARY

An autofocus assembly and related methods are described. One embodiment of the autofocus assembly includes a housing element. The housing element includes a hall housing wall configured to secure a hall sensor. The autofocus assembly includes a lens carriage configured to secure a hall magnet and configured to be received within the housing element and configured to define a receiving space between the lens carriage and the housing element to receive one or more bearing elements. The autofocus assembly includes a magnetic element disposed at the hall housing wall and configured to magnetically attract the hall magnet and to secure the hall housing wall to the housing element and secure the one or more bearing elements between the hall housing wall and the lens carriage.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
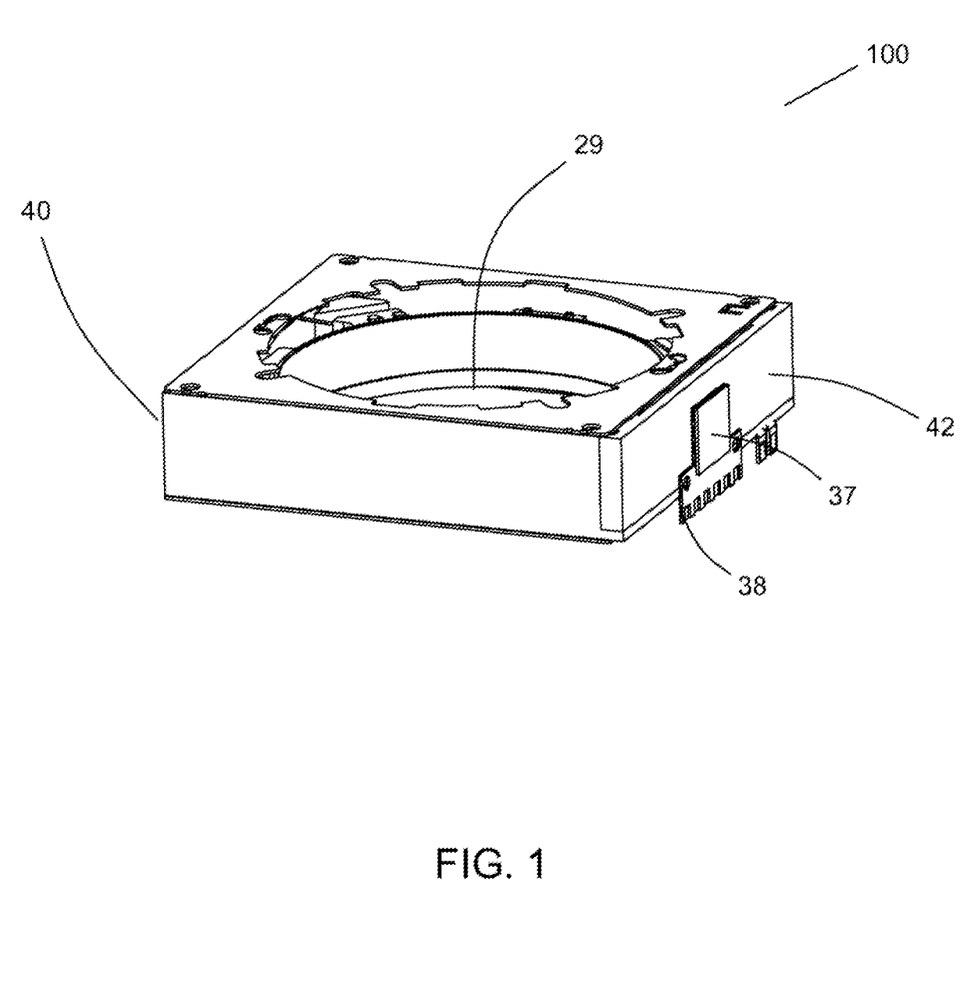
FIG. 1 illustrates a ball bearing autofocus assembly, according to an example of the disclosure.

Embodiments of a guided autofocus assembly are described herein that include a compact footprint and that enable a high actuation height, for example movement in the positive z-axis direction (z-direction), referred to herein as the z-stroke. FIG. 1 illustrates a guided autofocus assembly 100, according to an example of the disclosure. The assembly 100 includes an optical axis 29 configured to be aligned with an image sensor. The assembly 100 also includes a housing 40 and a hall housing wall 42. The assembly 100 includes a magnetic element 37 configured to be affixed to a flexible printed circuit board ("FPC") 38. The flexible printed circuit board is configured to be affixed to the hall housing wall 42. The magnetic element 37 is located relative to the hall sensor 36, as seen in FIG. 2, on a first side of the assembly 100 so that the hall sensor 36 is configured to indicate the position of a lens element along the optical axis 29.

Figure 2:
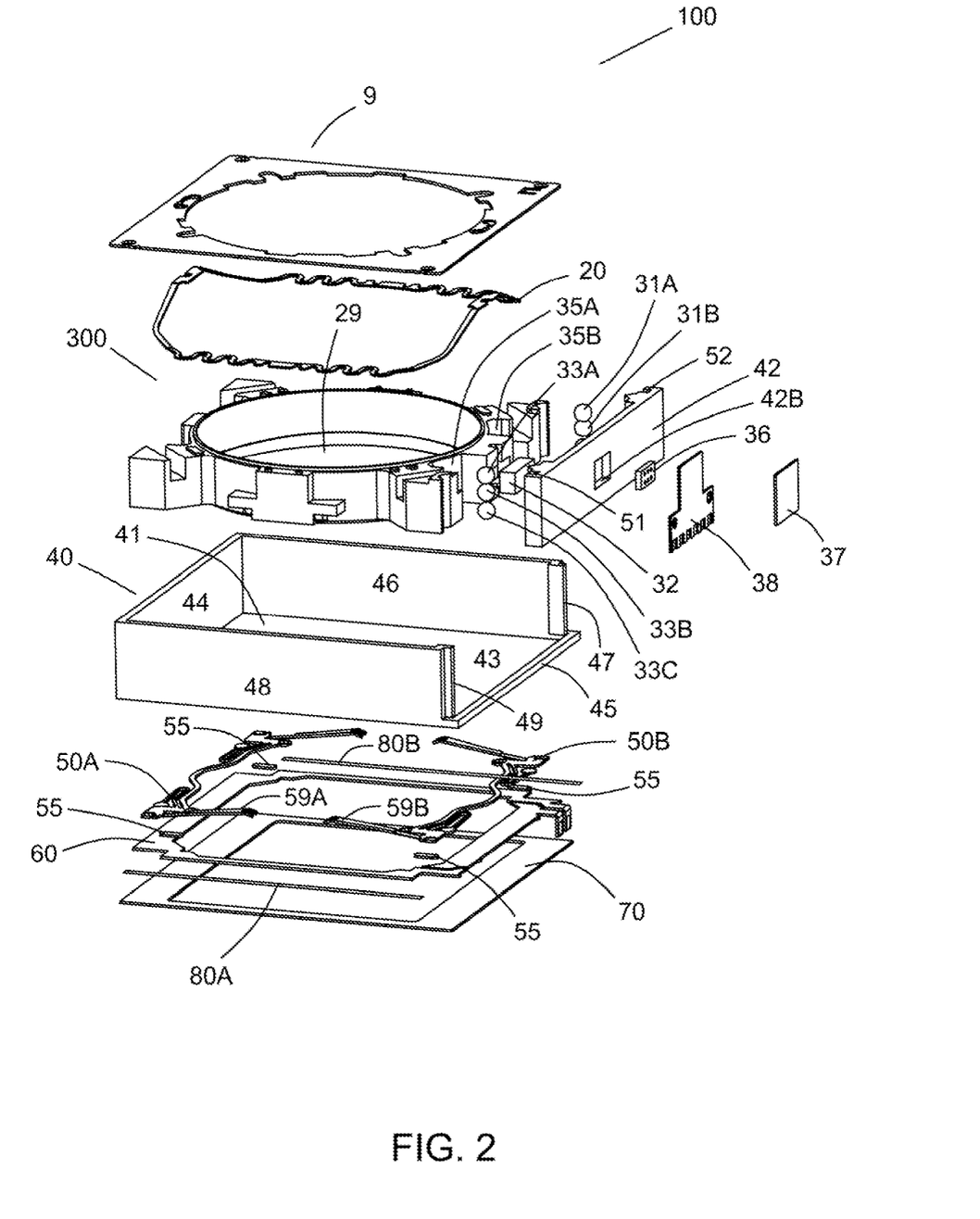
FIG. 2 illustrates an exploded view of the ball bearing buckle autofocus assembly of FIG. 1, according to an example of the disclosure.

FIG. 2 illustrates an exploded view of the guided autofocus assembly of FIG. 1, according to an example of the disclosure. The assembly 100 includes a cover 9, a spring element 20, a lens carriage 300, a housing element 40, a first buckler frame 50A, a second buckler frame 50B, SMA wires 80A and 80B, a slide base 60, and an assembly base 70. The lens carriage 300 can be received within the housing element 40.

The cover 9 is configured to secure the spring element 20 to the lens carriage 300. The spring element 20 is configured to apply a force in the opposite direction to the z-stroke direction on the lens carriage 300, which according to some embodiments is in a direction parallel to the optical axis 29. The spring element 20 is configured, according to various embodiments, to move the lens carriage 300 in the opposite direction of the z-stroke direction when tension in the SMA wires 80A and 80B is lowered as the SMA wires are de-actuated. The spring element 20, according to some embodiments, is made from stainless steel.

The housing 40 includes a center wall 44, a first adjacent wall 46, a second adjacent wall 48, and an open face 43 opposite the center wall 44. The housing 40 also defines a receiving space 41. The receiving space 41 is configured to receive the lens carriage 300. The housing 40 also includes a hall housing wall 42. The hall housing wall 42 is configured to secure one or more ball bearings, a hall magnet 32, and a hall sensor 36. The hall magnet 32 is secured to the lens carriage 300. The hall sensor 36 is secured within an aperture 42B in the hall housing wall 42 according to some embodiments.

While ball bearings are illustrated herein, the bearings may be replaced by any of the following types of bearing elements including, but not limited to: jewel bearing; fluid bearing; magnetic bearing; flexure bearing; composite bearing; and polyoxymethylene ("POM") sliding bearing. Further, the ball bearings may also be replaced by a rocker or pivot bearing, where the bearing element pivots or rocks on the moving and static elements.

A magnetic element 37 is disposed at the hall housing wall 42 to magnetically attract the hall magnet 32. In some examples, the magnetic element 37 is affixed to the flexible printed circuit board 38 using adhesive. For some embodiments, the flexible printed circuit board 38 is affixed to the hall housing wall 42 using adhesive. The hall housing wall 42 is configured to secure the elements, such as the ball bearings and the hall magnet 32 between the hall housing wall 42 and the lens carriage 300. The hall sensor 36 is configured to determine the amount of movement the lens carriage 300 moves in the z-direction along the optical axis 29 from an initial position based on a distance that the hall magnet 32 is from the hall sensor 36. According to some embodiments, the hall sensor 36 is electrically coupled with a controller or a processor on the FPC 38.

The controller or processor implemented in the FPC 38 generates the drive signals and supplies them to the SMA wire 80 to which it is connected. The controller or processor also receives an input signal representing a desired position for the lens carriage 300 along the optical axis 29 and generates drive signals to drive the lens carriage 300 to the desired position. The drive signals may be generated using closed-loop control based on the output of the hall sensor 36 which senses the position of the lens carriage 300 along the optical axis 29.

In some examples, receiving spaces 35 are formed between the hall housing wall 42 and the lens carriage 300. Each of the receiving spaces 35 are configured to receive one or more ball bearing. For example, a first receiving space 35A includes ball bearings 31A, 31B, and 31C. Likewise, a second receiving space 35B includes ball bearings 33A, 33B, and 33C. The hall housing wall 42 of the lens carriage 300 also includes a receiving space for the hall magnet 32, positioned between the first and second receiving spaces 35A, 35B according to some embodiments.

The end of the first adjacent wall 46 at the open face 43 includes an engagement feature 47. Likewise, the end of the second adjacent wall 48 at the open face 43 includes an engagement feature 49. The housing 40 also includes a base engagement feature 45 that is between the first adjacent wall 46 and the second adjacent wall 48 at the open face 43. Other embodiments include a housing element 40 that does not include an engagement feature 45. The hall housing wall 42 includes an engagement feature 52 at a first end and a second engagement feature 51 at a second end opposite the first end.

The engagement feature 52 of the hall housing wall 42 is configured to couple with the engagement feature 47 of the housing 40. Likewise, the engagement feature 51 of the hall housing wall 42 is configured to couple with the engagement feature 49 of the housing 40. The hall housing wall 42 is configured to be secured to the base engagement feature 45.

First and second buckler frames 50A, 50B are configured to engage the lens carriage 300. This is discussed in greater detail below, with respect to FIG. 3. The first and second buckler frames 50A, 50B are secured to the slide base 60. The slide base 60 may be formed of metal, such as stainless steel, using techniques including those know in the art. However, one skilled in the art would understand that other materials could be used to form the slide base 60.

Further, the first buckler frame 50A includes buckler arms 59A coupled to the slide base 60. Similarly, the second buckler frame 50B includes buckler arms 59B coupled to the slide base 60. The slide base 60 can include slide bearings 55 configured to minimize any friction between the slide base 60 and a buckler arms 59A, 59B. According to various examples of the disclosure, the slide bearings 55 may be formed of polyoxymethylene ("POM"). One skilled in the art would understand that other structures could be used to lower any friction between the buckle actuator and the base, such as slide bearings made out of metal such as bronze. The slide base 60 is configured to couple with an assembly base 70 such as an autofocus base for an autofocus assembly.

Figure 3:
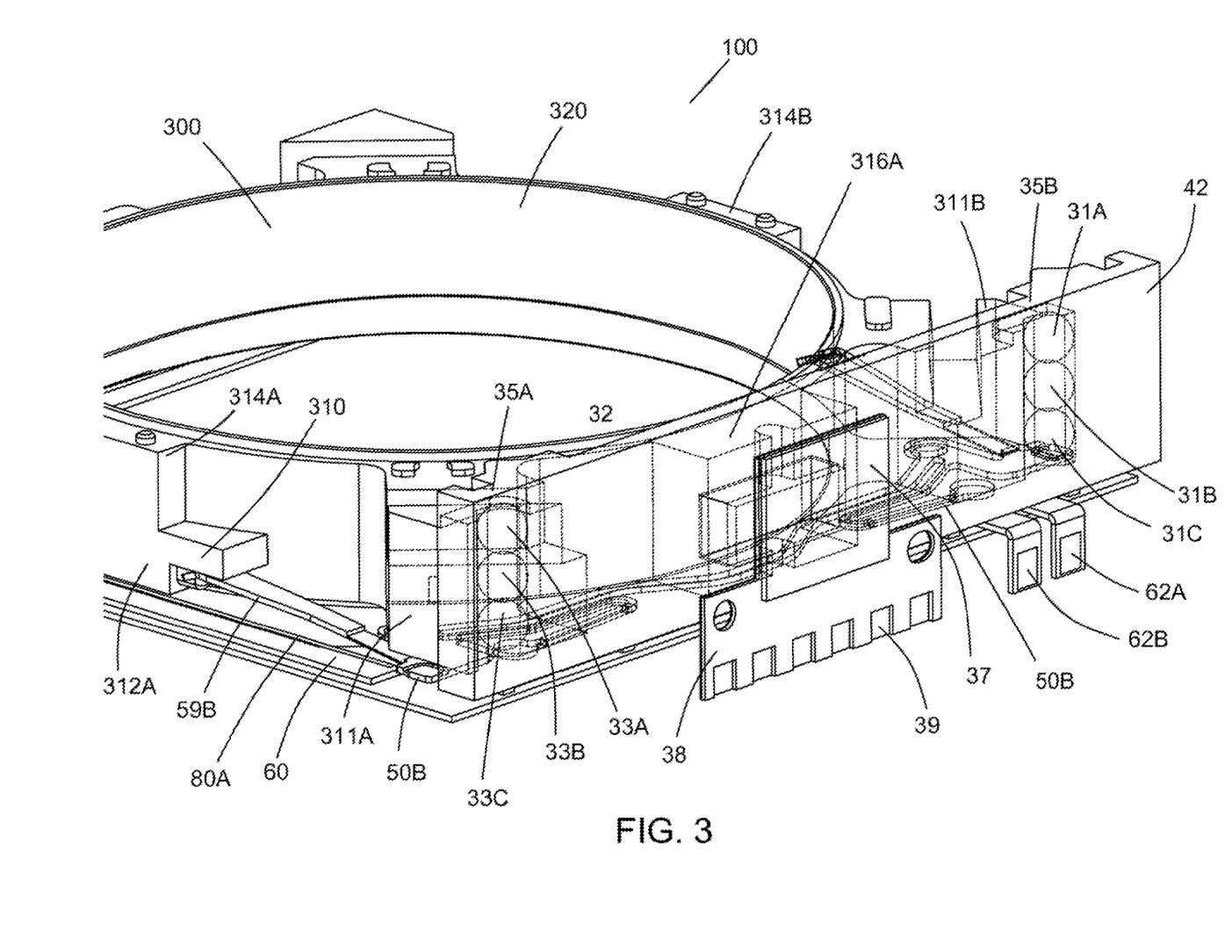
FIG. 3 illustrates configuration of the ball bearings of the ball bearing buckle autofocus assembly, according to an example of the disclosure.

FIG. 3 illustrates the configuration of the one or more ball bearings of the assembly 100, according to an example of the disclosure. The lens carriage 300 includes a circular frame 320. The circular frame 320 includes a first lateral protruding element 314A and a second lateral protruding element 314B. The first and second lateral protruding elements 314A, 314B each include a respective surface 312 aligned with a corresponding section of the first and second lateral walls 46, 48, respectively, of the housing 40 (shown in FIG. 2). The first lateral protruding element 314A, according to some embodiments, also includes a pair of engagement elements 310. Only one engagement element 310 is illustrated, but it should be understood by one of ordinary skill in the art that a second engagement element 314B extends in the opposite direction of the engagement element 310.

The lens carriage 300 is also configured to be disposed on the buckler frames 50A and 50B. The buckle frames 50A and 50B are attached to a slide base 60. Some examples include a slide base 60 split to electrically isolate the two sides, as one side is typically used for as a ground and the other side is power. Other embodiments include, include a slide base 60 with the two sides are electrically coupled to each other.

The buckler frames 50A and 50B include buckle arms 59A and 59B, respectively. Each buckle arm of the buckle arm pairs 59A and 59B are formed on a separate portion of its respective buckler frame 50A and 50B.

The buckle arms 59A and 59B are configured to move in the z-axis when the SMA wires are actuated and de-actuated, as described herein. The buckle arms 59A and 59B are configured to engage the engagement element 310 of the lens carriage 300. In some examples, the buckle arms 59A and 59B can be configured to engage with other elements of the lens carriage 300. For example, the buckle arms 59A and 59B may be coupled with each other through a center portion such as a hammock portion, which is configured to cradle a portion of an object (e.g., lens carriage 300). According to these embodiments, the buckle arms 59A and 59B are configured to act on an object to move it. For example, the buckle arms are configured to act directly on features of a lens carriage 300 to push it upward.

The circular frame 320 also includes corner elements 311. While two corner elements are illustrated herein, it should be apparent to one of ordinary skill in the art that the circular frame 320 includes two additional corner elements 311 at the opposite end of the lens carriage 300. The four corner elements 311 are configured to center the lens carriage 300 within the housing 40 and along the optical axis 29.

The lens carriage 300 includes a first housing element 316A, configured to secure the hall magnet 32. The FPC 38 is also located at the first end of the lens carriage 300. The magnetic element 37 is configured such that the hall magnet 32 draws the lens carriage 300 toward the magnetic element 37, effectively securing the one or more ball bearings in between the hall housing wall 42 and the lens carriage 300 within the receiving spaces 35. The FPC 38 includes multiple contact pads 39. The contact pads 39 may be gold plated stainless-steel pads, configured to power one or more components of the ball bearing autofocus assembly. The hall housing wall 42 is mechanically coupled to the ball bearings 33, enabling an actuation process for moving the ball bearings in a z-direction along the optical axis. The first end of the lens carriage 300 also includes the receiving spaces 35A and 35B formed between the lens carriage 300 and the hall housing wall 42.

The receiving spaces 35A and 35B may be formed as a triangle. In some examples, the hall housing wall 42 includes a first surface and the corner element 311A includes a v-shaped groove, configured to complete the shape of the triangle. In other examples, the hall housing wall 42 includes a first surface including a v-shaped groove and the corner element 311A includes a v-shaped groove aligned with the v-shaped groove of the first surface. The receiving spaces 35A and 35B may be lubricated, in some examples, to enable a low friction environment for the ball bearings. For example, the receiving space 35A may be lubricated to enable low friction rotation and displacement of the ball bearings 33A, 33B, and 33C. Likewise, the receiving space 35B may be lubricated to allow for the rotation and displacement of the ball bearings 31A, 31B, and 31C.

Furthermore, the lubrication provides a low surface roughness in order to minimize friction and improve dynamic tilt. In some examples of the disclosure, the hall housing wall 42 and the lens carriage 300 (and consequently the corner elements) are made of plastic. Forming the receiving spaces 35A and 35B of plastic and lubricating the interior surfaces of the receiving spaces 35A and 35B gives a smooth surface on which the balls can run and allows the desired dynamic tilt performance to be achieved.

The location of the ball bearings 31A-C and 33A-C relative to the location where the lengths of SMA actuator wires 80 apply force to the lens carriage 300 assists in constraining against rotation about an axis normal to a plane containing the optical axis 29. This is because the coupling between the forces applied by the lengths of SMA actuator wires 80 and by the ball bearings 31A-C and 33A-C is reduced, compared to the bearings 31A-C and 33A-C being located further away. This effect is improved by the number of ball bearings, which increases the length of the ball bearings along the optical axis 29. Thus, the embodiments of the guide bearing autofocus assembly has better performance over the current state of autofocus assemblies resulting in a more efficient assembly that improves picture quality.

The slide base 60 includes contact pads 62A and 62B. The contact pads 62A and 62B may be gold plated stainless-steel pads, configured to power the SMA wires 80A and 80B. This is discussed in greater detail below, with respect to FIGS. 4 and 5.

Figure 4:
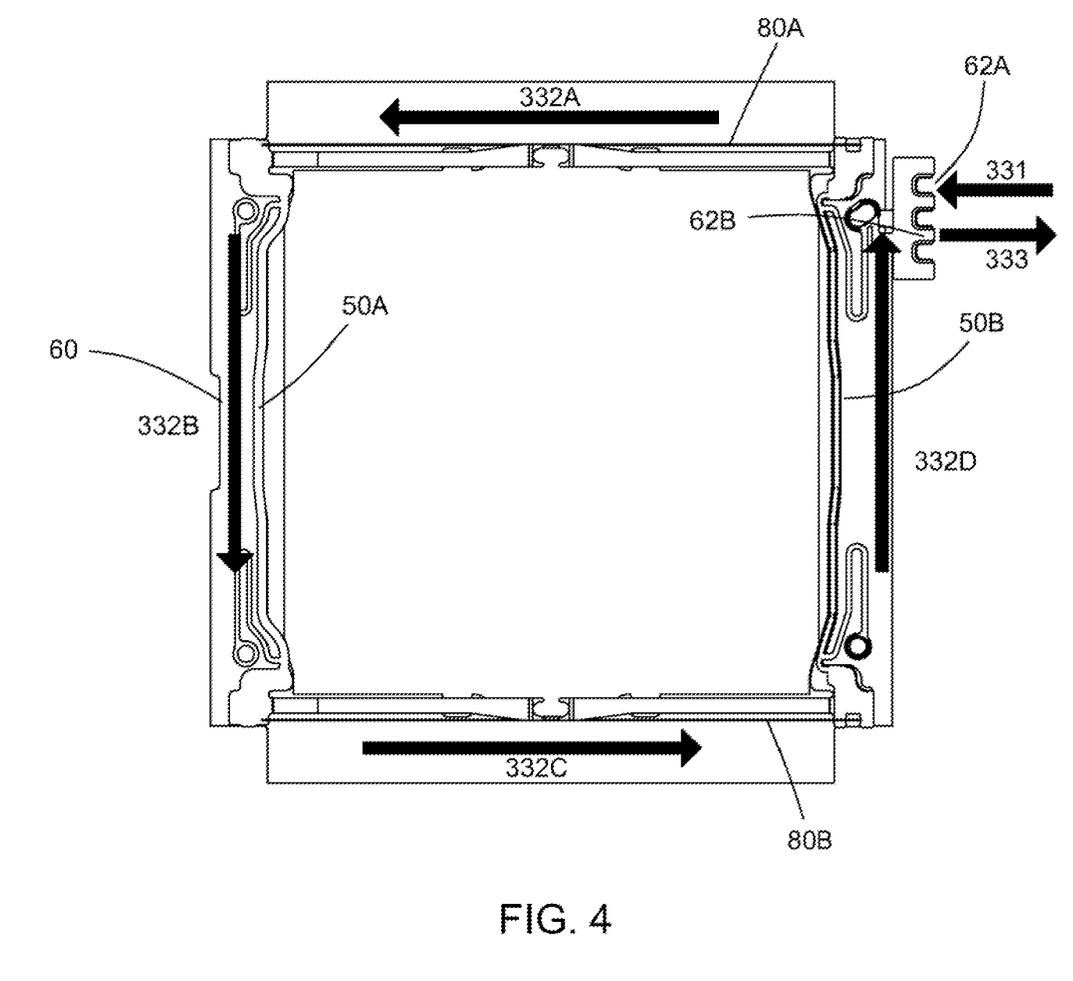
FIG. 4 illustrates a circuit design of the SMA wires of the ball bearing buckle autofocus assembly, according to an example of the disclosure.

FIG. 4 illustrates an exemplary circuit design of the SMA wires 80A and 80B of the assembly 100, according to an example of the disclosure. The SMA wires 80A and 80B are wired in series. For example, power 331 is provided to power the SMA wires 80A, 80B via contact pad 62A. The current flows in direction 332A along SMA wire 80A, into the slide base 60 along current flow direction 332B. The current flows in direction 332C along SMA wire 80B, and into the slide base 60 along current flow direction 332D. Finally, the current flows to contact pad 62B. Therefore, the same current applied to SMA wire 80A is applied to SMA wire 80B. By applying the same current through SMA wires 80A and 80B, more even heat is applied to both wires. Applying more even heat to the SMA wires 80A and 80B reduces the imbalance of force that the buckler actuator applies to the two sides of the lens carriage and reduces dynamic tilt, which leads to better picture quality across all pixels of an image sensor.

Figure 5:
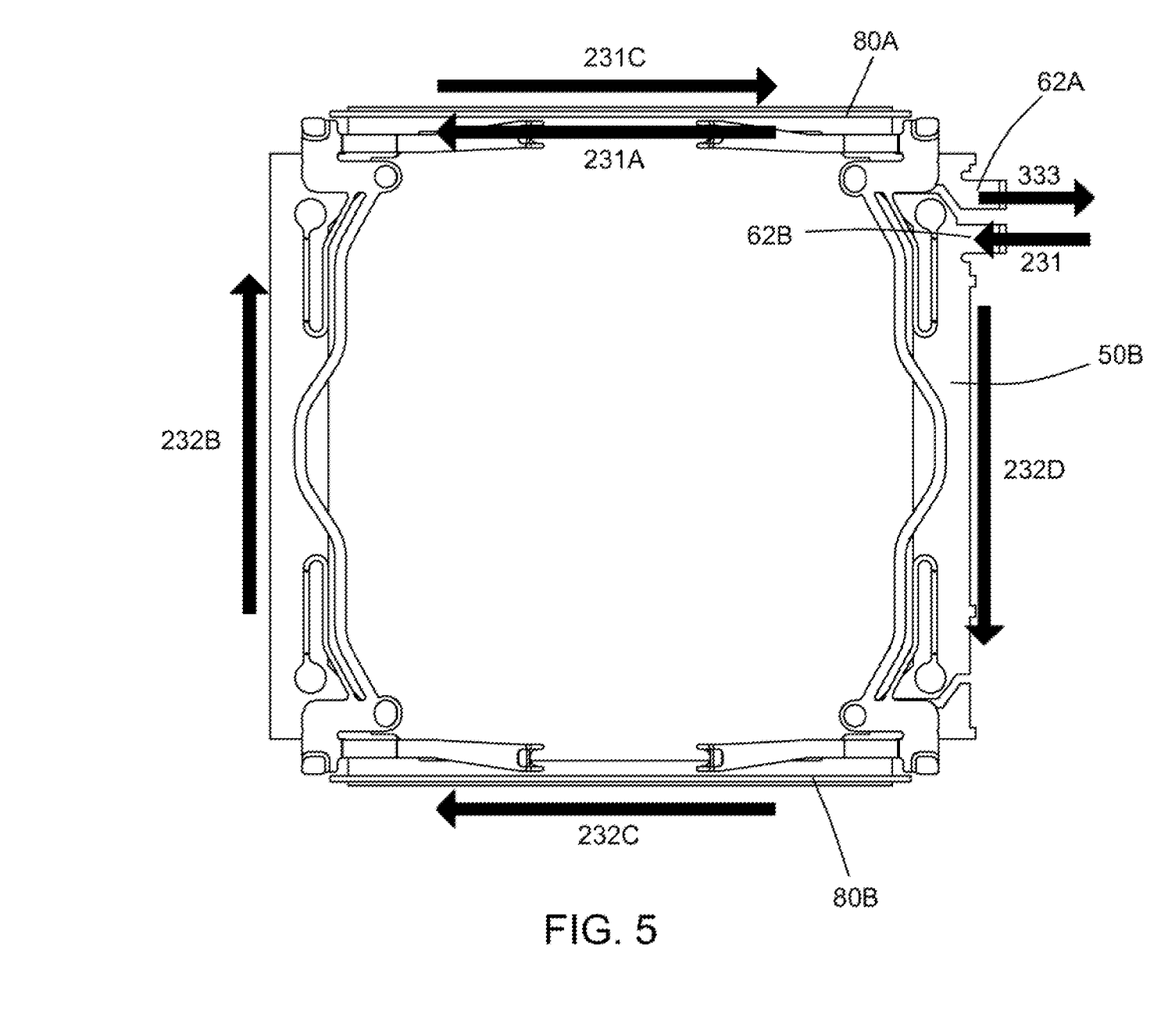
FIG. 5 illustrates a circuit design of the SMA wires of the ball bearing buckle autofocus assembly, according to an example of the disclosure.

FIG. 5 illustrates an exemplary circuit design of the SMA wires 80A and 80B of the assembly 100, according to an example of the disclosure. In some examples, the SMA wires 80A and 80B are wired in parallel. For example, power 231 is provided to power the SMA wires 80A, 80B via contact pad 62B. The current flows in direction 231A along SMA wire 80A, into the slide base 60 along current flow direction 231C. The current also flows in direction 232D into the slide base 60, along SMA wire 80B in direction 232C, SMA wire 80B, in direction 232B and into the slide base 60 along current flow direction 231C. Finally, the current flows to contact pad 62A.

The heat to the SMA wires 80A and 80B depends on the resistance variation due to manufacturing of the SMA wire lengths. Therefore, each side may be pushing the lens carriage 300 at different forces, causing the assembly 100 of FIG. 5 to be more susceptible to tilt variation. However, the ball bearing configuration disclosed herein mitigates this tilt variation such that it is a non-issue.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Additionally, the techniques described herein could be used to make a device having two, three, four, five, six, or more generally n number of bimorph actuators and buckle actuators. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A lens carriage adapted for use in an autofocus assembly, comprising:
    a circular frame;
    a first lateral protruding element extending from the circular frame on a first side, the first lateral protruding element includes at least one engagement element;
    a second lateral protruding element extending from the circular frame on a second side, the second lateral protruding element includes at least one engagement element, wherein a second buckle arm is configured to engage the at least one engagement element of the second lateral protruding element; and at least one receiving space formed on the circular frame configured to receive bearing elements.

2. The lens carriage of claim 1, wherein the at least one receiving space is formed between the lens carriage and a hall housing wall.

3. The lens carriage of claim 2, wherein the least one receiving space is lubricated to enable a low friction environment for the bearing elements.

4. The lens carriage of claim 1, wherein a location of the at least one receiving space assists in constraining against rotation about an axis normal to a plane containing an optical axis.

5. The lens carriage of claim 1, wherein the first and second lateral protruding elements, each include a respective surface aligned with a corresponding section of first and second lateral walls of a housing.

6. The lens carriage of claim 1, wherein a first buckle arm is configured to engage the at least one engagement element of the first lateral protruding element.

7. The lens carriage of claim 1, further comprising at least one corner element extending from the circular frame and configured to center the lens carriage within a housing along an optical axis.

8. The lens carriage of claim 7, the at least one receiving space is formed on the at least one corner element extending from the circular frame.

9. The lens carriage of claim 1, further comprising a first housing element extending from the circular frame configured to secure a hall magnet in an aperture.

* * * * *